United States Patent [19]

Schad

[11] Patent Number: 4,481,806

[45] Date of Patent: Nov. 13, 1984

[54] DETECTOR FOR A METER PROVER

[75] Inventor: Charles A. Schad, Tulsa, Okla.

[73] Assignee: Metric Corporation, Tulsa, Okla.

[21] Appl. No.: 439,939

[22] Filed: Nov. 8, 1982

[51] Int. Cl.³ .......................... G01F 25/00; H01H 3/16
[52] U.S. Cl. ........................................... 73/3; 335/153;
335/205; 200/61.41
[58] Field of Search .......................... 73/3; 200/61.41;
335/153, 205

[56] References Cited

U.S. PATENT DOCUMENTS

| 2,963,563 | 12/1960 | Patterson . | |
|---|---|---|---|
| 3,021,703 | 2/1962 | Pfrehm . | |
| 3,145,274 | 8/1964 | Van Scoy et al. . | |
| 3,155,792 | 11/1964 | Werts . | |
| 3,205,323 | 9/1965 | Deshautreaux, Jr . | |
| 3,253,338 | 5/1966 | Burnette, Jr. . | |
| 3,306,251 | 2/1967 | Suttle | 73/3 |
| 3,327,079 | 6/1967 | Widl . | |
| 3,406,267 | 10/1968 | Kohls . | |
| 3,418,611 | 12/1968 | Pounds . | |
| 3,421,124 | 1/1969 | Kidd . | |
| 3,478,717 | 11/1969 | Kidd . | |
| 3,980,980 | 9/1976 | Zioni et al. | 335/205 |
| 4,039,985 | 8/1977 | Shlesinger, Jr. et al. . | |
| 4,079,619 | 3/1978 | Dobesh . | |
| 4,168,413 | 9/1979 | Halpine | 73/3 |
| 4,225,837 | 9/1980 | Fowler . | |

Primary Examiner—S. Clement Swisher
Attorney, Agent, or Firm—Dunlap & Codding

[57] ABSTRACT

A prover detector comprising a barrel having a longitudinal bore formed therethrough to receive a proximity switch mounted in one end thereof and a piston mounted in the other end thereof to extend from the barrel bore into the prover. The proximity switch is of the type that is responsive to the proximity of an unmagnetized, ferromagnetic mass near the end thereof disposed within the barrel bore for closing a set of contacts in the proximity switch and the piston has a cylindrically symmetric portion at the end thereof nearest the proximity switch, such portion centered on an axis of movement of the piston relative to the proximity switch defined by the barrel bore, so that the position of the piston for which the contacts in the proximity switch close depends only upon the distance between the proximity switch and the piston.

8 Claims, 1 Drawing Figure

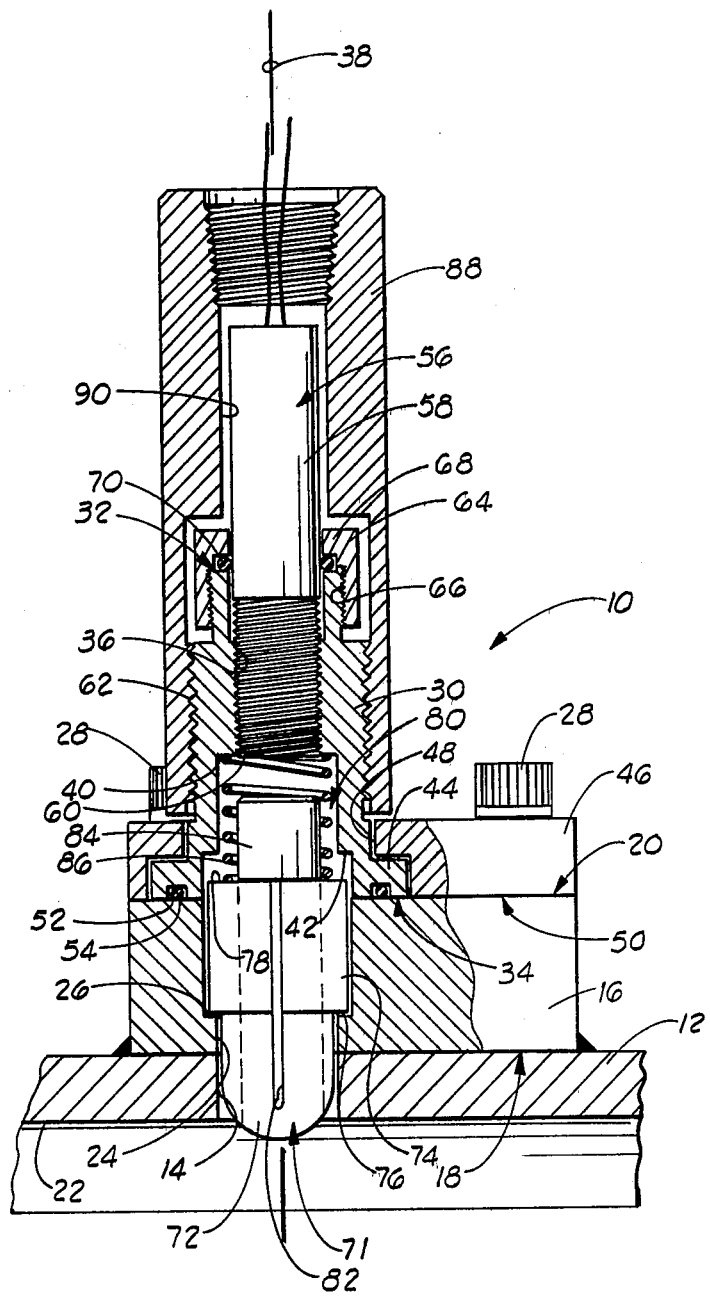

DETECTOR FOR A METER PROVER

BACKGROUND OF THE INVENTION

1. Field of the Invention

The present invention relates generally to improvements in sensing devices and, more particularly, but not by way of limitation, to devices used to detect the passage of a travelling liquid displacer in a pipe type meter prover.

2. Brief Description of the Prior Art

In commerce and industry, a need often exists to measure the amount of liquid that is passed through a conduit and appropriate meters, that can be mounted on conduits, have been developed for this purpose. In some circumstances, the accuracy of a meter on a conduit can be an important consideration to parties having an interest in the passage of the liquid through the conduit and the oil industry provides an example of such circumstances. Title to oil may pass from one party to another party with the passage of the oil through a pipeline and the price the buyer pays the seller is determined by the amount of oil he has received as determined by a meter on the pipeline. Since even a small inaccuracy in the meter, over an extended period of time, can make a substantial difference in the amount of money that changes hands, meter accuracy is important to both the buyer and the seller of the oil. It is common practice in these circumstances for the contract of sale of the oil to call for the periodic proving, or calibration, of the meter and a prover is used for this purpose.

A prover is essentially a pipe that includes a traveling liquid displacing seal member, often an inflated elastic sphere or piston, and a pair of detectors to provide signals that indicate the passage of the displacer at two spaced locations on the prover at which the detectors are located. The prover is constructed to be connected, via appropriate valves, to a conduit upon which the meter to be proved is mounted such that liquid passing through the meter is diverted from the conduit to also pass through the prover and move the displacer between the two detectors. The detectors, by marking the location of the displacer at two different points in the prover, define a volume of liquid which has passed through the meter and such volume is used to calibrate the meter. In general, two types of pipe provers are used: the unidirectional type in which the displacer is passed from one end of the prover to the other and then returned to the starting end for a subsequent run through the prover and the bidirectional type in which the displacer is passed back and forth through the prover during each proving run.

In order for the prover to carry out its purpose of proving meters, the prover itself must be calibrated so that the amount of liquid that passes through the prover, between detections of the displacer, will be known. Such calibration is carried out by the water draw method in which water is passed through the prover with the effluent from the prover, during the passage of the displacer between the detectors, being captured for measurement using containers whose volumes have been very accurately determined. This calibration of the prover is a time consuming and difficult task, and almost entirely reliant upon the accuracy and repeatability of the detectors, with the result that such calibration is not lightly undertaken.

Initially, it will be noted that almost all prior art prover detectors include a piston that has a portion extending into the prover to be engaged by the displacer and forced outwardly of the prover as the displacer passes the detector. In one type of prior art detector, a portion of the piston passes through a dynamic seal so that a mechanical coupling to an appropriate switch can provide the appropriate closure of electrical contacts in the switch. In another type of prior art detector, the piston carries a magnet, or several magnets, and the detector includes a reed switch that can be actuated by the magnet, or magnets, as the piston is moved by the travelling displacer member to bring the magnets near the reed switch. Both of these types of detectors give rise to inaccuracies in the relative positions of the displacer and the detector that are related to the position of the piston for which closure of electrical contacts occurs.

In the mechanical type detector, the use of a dynamic seal can have the effect of making the closure point for the contacts dependent upon pressure in the prover. At higher pressures, the dynamic seals become stiff so that a greater force must be exerted on the piston to cause the piston to move outwardly of the prover. In addition, springs in the detector that return the piston to a position to engage the displacer must have a relatively high spring constant to accomplish this purpose. As a result, the displacer, which as noted above is often an inflated elastic sphere, is called upon to exert a considerable force on the piston and the displacer can be distorted thereby. Where this occurs, the position of the displacer relative to the detector, for closure of contacts in the detector during a proving run, can vary from the position of the displacer relative to the detector that occurred during the calibration of the prover. That is, the calibrated volume of liquid that passes through the prover as the displacer passes between the detectors, as determined by the calibration of the prover, does not apply in circumstances under which the prover is used to prove a meter so that the proving of the meter will be inaccurate. This problem is especially severe where the prover is a unidirectional prover; in a bidirectional prover, inaccuracies stemming from the position of the displacer member for closure of the detector contacts tend to be offsetting. Even so, however, it is not desirable that the inaccuracy exist even for the bidirectional prover since the degree to which the position of the displacer is inaccurate, and the effect of such inaccuracy on the calibration of the meter, cannot be known.

The magnet and reed type detector can simlarly give rise to faulty detection of a precise location of the displacer relative to the detector at which contacts in the detector close because of inherent asymmetries that exist in such detectors. In particular, should the piston in the detector rotate about the axis of movement of the piston from the prover, the geometry of the magnetic field produced by the magnet, or magnets, carried by the piston will change at the reed switch so that the point at which the reed switch closes becomes an undetermined function of the orientation of the piston about its axis of movement. Again, the result is that the position of the displacer for closure of contacts in the detector cannot be relied upon so that the calibration of the prover cannot be relied upon.

Other problems, stemming from this basic lack of reliability of prior art detectors, are also encountered. In order to minimize the above problems, the detectors are tuned during calibration of a prover and such tuning cannot be duplicated in the factory. For example, in the case of the magnet and reed type detector, such tuning might be carried out to find a position of the reed for which the closure point of the piston is a slowly varying function of the relative orientations of the reed and magnets in the detector.

SUMMARY OF THE INVENTION

The present invention solves these and other problems by providing a detector for a prover that will reliably retain the calibration of the prover over extended periods of time. To this end, the contacts that are to be closed by the passage of the displacer through the prover are contained in a magnetic proximity switch that senses the presence of a body of unmagnetized, ferromagnetic material and are closed as such body of material is brought into proximity with the switch along an approach axis that is determined by the construction of the proximity switch. In the detector of the invention, such axis is made the axis of movement of the piston and the piston is provided with a portion, at the end thereof nearest the proximity switch, that is constructed of a ferromagnetic material and is made cylindrically symmetric with respect to the approach axis. By this means, dynamic seals in the detector, and the problems associated therewith, can be eliminated since no contact between the piston and switching elements of the detector is needed. Thus, the detector of the present invention is immune to the problems that have arisen with the use of mechanically actuated detectors. In particular, only a very small force needs to be exerted on the piston to cause actuation of the proximity switch so that distortion of the travelling displacer in the prover is eliminated as a source of inaccuracy in the calibration of the prover. Similarly, the detector of the present invention is immune to problems that have been encountered with magnet and reed type detectors. In particular, since the proximity switch is actuated by a cylindrically symmetric portion of the piston that approaches the proximity switch along the axis of symmetry of such portion, the relative orientations of the proximity switch and piston can have no effect upon the position, along such axis, of the piston for which the switch is actuated. Thus, once calibrated, a prover containing detectors constructed in accordance with the present invention will remain calibrated over long periods of time.

The immunity of the detectors of the present invention to the problems which have existed for prior art detectors also solves the additional problems that have been mentioned above by eliminating any need for tuning of the detectors to find an internal geometry of the detector that will minimize problems with consistency of position of the piston for closure of the contacts. Rather, since the only parameter that determines the closure of contacts in the proximity switch is an axial position of the piston, the detector can be set in the factory to close for a predetermined position. An advantage of such setting is that a detector can be replaced without disturbing the calibration of a prover. To this end, the position of the piston for which contacts are closed can be fixed with respect to a surface on the detector body that can be precisely positioned on a prover by a suitable bracket that is mounted permanently on a prover. Thus, should it become necessary to replace a detector, the replacement detector can be factory set to eliminate a need for recalibration of the prover following the replacement. Moreover, since the detector can be factory set, unauthorized adjustment of the detector in the field can be eliminated by fixing the parts of the detector used to accomplish adjustment thereof in the factory to prevent such adjustment in the field. In particular, the parts of the detector used for the adjustment can be coated with a suitable potting compound, such as an epoxy resin, as the detector is adjusted in the factory so that field operatives cannot adjust such parts without leaving indications of such unauthorized adjustment.

An important object of the present invention is to provide a prover detector which detects the position of a prover travelling displacer, relative to the detector, consistently for each passage of the displacer through the prover.

Another object of the present invention is to provide a detector for a prover which will maintain the prover calibration over long periods of time.

Still a further object of the present invention is to provide a prover detector that can be replaced without disturbing the calibration of the prover upon which the detector is installed.

Another object of the present invention is to provide a prover detector that prevents tampering in the field that can result in the loss of calibration of a prover upon which the detector is mounted.

Other objects, advantages and features of the present invention will become clear from the following detailed description of the preferred embodiment of the invention when read in conjunction with the drawing and appended claims.

BRIEF DESCRIPTION OF THE DRAWING

The drawing is a cross section in side elevation and partial cutaway of a prover displacer detector constructed in accordance with the present invention showing the mounting of the detector on a prover.

DESCRIPTION OF THE PREFERRED EMBODIMENT

Referring now to the drawing, shown therein and designated by the general reference numeral 10 is a prover detector constructed in accordance with the present invention. In use, the detector 10 is mounted on a prover 12 and a portion of the detector 10 extends into the prover 12 via a hole 14 formed through the wall thereof.

The mounting of the detector is accomplished by means of a bracket that is fixed to the prover 12 and an exemplary form of the bracket, designated by the numeral 16 in the drawing, has been illustrated for completeness of disclosure. However, it will be understood that the present invention is not limited by the form of the bracket illustrated. Rather, the form shown has been selected to clearly present desirable features of the bracket that are exploited in the use of the detector 10. Other forms of brackets can be used and the desirable features can be provided by a suitable adapter which, in effect, becomes a part of the bracket. It will be useful, prior to discussing the structure of the detector 10, to briefly consider the bracket 16 and point out the desirable features thereof that can be exploited in the practice of the present invention.

In the form shown, the bracket 16 has the general shape of a rectangular parallelepiped, a lower side 18 of which is fixed to the prover 12 by welding as has been indicated in the drawing. The upper side 20 of the bracket 16 will thus be a plane surface that is spaced from the inner periphery 22 of the prover 12 a distance that is fixed for the lifetime of the prover. A bore 24 is formed through the bracket 12 to align with the hole 14 through the wall of the prover 12 and portions of the bore 24 adjacent the upper surface 20 thereof are counterbored to form a shoulder 26 near the lower side 18 of the bracket 16. A plurality of threaded holes (not shown) are formed in the upper surface of the bracket 16 to permit mounting of the detector 10 thereon via bolts 28 in a manner to be discussed below.

Turning now to the detector 10, the detector 10 comprises a barrel 30 which is constructed of a non-ferromagnetic material such as type 303 stainless steel. The barrel 30 has a generally tubular form; that is, the barrel 30 has an upper end 32 and a lower end 34 and a bore 36 is formed through the barrel 30 about an axis 38 to intersect the upper and lower ends 32, 34 thereof. Adjacent the lower end 34 of the barrel 36, the bore 36 is twice counterbored to form two shoulders 40, 42 in the bore 36 facing the lower end 32 of the barrel 30 for a purpose to be discussed below.

The lower end 32 of the barrel 30 is planar to mate with the upper side 20 of the bracket 16 so that the lower end 34 of the barrel 30 will be spaced a fixed distance from the inner periphery 22 of the prover 12 when the detector 10 is mounted on the bracket 16. The lower end 34 of the barrel 30 thus forms a reference plane for gauging positions of parts of the detector 10 relative to the barrel 30 and such gauging will fix geometrical relationships between such parts and the prover 12 as will be discussed below. The barrel 30 is further provided with a flange 44, at the lower end 32 thereof, so that the detector 10 can be fixed to the bracket 16 via a mounting plate 46. Specifically, the plate 46 has a bore 48 formed therethrough to pass portions of the barrel 28 above the flange 42. The bore 48 is counterbored adjacent the lower side 50 of the plate 46 to receive the flange 44 and the plate 46 is provided with a plurality of holes (not shown) to receive the bolts 28 therethrough for connecting the plate 46 to the bracket 16. As has been indicated in the drawing, the bolt holes through the mounting plate 46 are positioned such that the axis 38 of the barrel bore 36 coincides with the axes of the hole 14 in the prover wall and the bore 24 through the mounting bracket 16. A static seal between the lower end 34 of the barrel 30 and the upper side 20 of the mounting bracket 16 can be provided by means of a groove 52 formed in the lower end 34 of the barrel 30 to extend circumferentially about the bore 36 therethrough and an O-ring 54 disposed in the groove 52.

Portions of the bore 36 of the barrel 30, near the upper end 32 of the barrel, are threaded to permit screw mounting of a proximity switch 56 in the bore 36, the casing 58 of the proximity switch 56 being externally threaded for this purpose. In the practice of the invention, the proximity switch 56 is selected to be of the type that has been disclosed in U.S. Pat. No. 4,225,837, such switches being available from General Equipment and Manufacturing Company of Louisville, Ky. In a switch of this type, internal magnets establish a flux pattern in which an armature having electrical contacts thereon is disposed. In the absence of nearby ferromagnetic materials, the flux pattern will position the armature to cause selected contacts thereon to be engaged or disengaged. When a body of ferromagnetic material is brought to a position adjacent the switch, the flux pattern is changed to reposition the armature and actuate the switch to cause a reversal of engaged and disengaged contacts. In the present invention, the proximity switch 56 is selected such that the switching mechanism therein is sensitive to ferromagnetic materials brought into proximity with a lower end 60 of the proximity switch along an approach axis that coincides with the axis of the casing 58; that is, along an approach axis that is defined by the bore 36 of the barrel 30 and directed toward the proximity switch 56 from the lower end 34 of the barrel 30.

Portions of the outer periphery 62 of the barrel 30, adjacent the upper end 32 thereof, are formed on a reduced diameter and threaded to provide for screw-mounting a cap 64 on the upper end 32 of the barrel, the reduction in size of the portion of the barrel 30 that receives the cap permitting the cap to have a diameter less than the diameter of lower portions of the barrel 30 for a purpose that will become clear below. The cap 64 has a threaded bore 66 and an internal flange 68 is formed at the upper end of the cap 64 to overlay the upper end 32 of the barrel so that an O-ring 70 mounted on the upper end of the barrel 30 and engaged by the flange 68 will provide a static seal between the barrel 30 and proximity switch 56 at the upper end 32 of the barrel 30.

The detector 10 further comprises a piston 71 which is disposed partially in the bore 36 of the barrel 30, the piston 71 having a protruding nose portion 72 that extends from the barrel 30, through the bore 24 in the bracket 16 and hole 14 through the wall of the prover 12, into the prover 12. The piston 71 has an enlarged central portion 74 that is sized to slide in the counterbore portion of the bore 24 of the bracket 16 and to slide in the lower counterbore portion of the barrel bore 36, such counterbore portions being made of equal size for this purpose. The shoulder 26 in the bracket 16 thus serves to provide a lower limit stop for the piston 71, the enlarged portion 74 of the piston 71 terminating in an annular shoulder 76 that engages the shoulder 24 at the maximum limit of extension of the piston 71 from the barrel bore 36. The enlarged portion 74 of the piston 71 similarly has an upper shoulder 78 that engages the shoulder 42 in the barrel bore 36 to define a minimum extension of the piston 71 from the barrel bore 36. As can be seen from the drawing, the counterbore portions of the bores 24 and 36 of the bracket 16 and barrel 30 define a cavity 80 in which the piston 71 slides. Pressure relief for such cavity is provided by a plurality of longitudinal grooves 82 that are formed in the peripheries of the enlarged central portion 74 and nose portion 78 of the piston 71.

An important aspect of the present invention is the inclusion in the piston 71 of a cylindrically symmetric portion 84 at the end of the piston 71 nearest the proximity switch 56, the portion 84 being oriented such that its axis coincides with the approach axis 38 of the proximity switch 56, and, further, the construction of the cylindrically symmetric portion 84 of the piston 71 of a ferromagnetic material. The latter is preferably accomplished by making the entire piston 71 of a ferromagnetic material such as type 416 magnetic stainless steel.

The detector 10 further comprises a compression spring 86, constructed of a non-ferromagnetic material and mounted between the shoulder 40 in the barrelbore 36 and the shoulder 76 at the upper end of the enlarged portion 74 of the piston 71, to urge the nose portion 72 of the piston 71 into the prover 12.

In the preferred embodiment of the detector 10, portions of the outer periphery 62 of the barrel 30 below the cap 64 are threaded and the detector 10 includes a cover 86 having a bore 88 that is shaped to fit closely about upper portions of the barrel 30, the cap 64 and portions of the proximity switch 56 that protrude from the bore 36 of the barrel 30. The above described relationship between the diameters of the cap 64 and the diameter of lower portions of the barrel 30 facilitates such close fitting between the cover 88 and the above listed components of the detector 10 as can be seen in the drawing.

ASSEMBLY AND ADJUSTMENT OF THE DETECTOR

The above described construction of the detector 10 enables the detector 10 to be assembled and adjusted in the factory so that no further adjustment in the field is required. Rather, field operations include only calibration of a prover upon which the detector 10 is mounted and such calibration will remain accurate for extended periods of time. Moreover, the construction of the detector, and the manner of factory adjustment, permit ready replacement of the detector 10 on a prover without disturbing the calibration of the prover as will be discussed below.

It is contemplated that, at the time the detector 10 is assembled, the detector 10 will be earmarked for a particular prover so that the distance between the bore 22 of the prover and the upper side 20 of the bracket 16 will be known. Such information is used to select the length of the piston 71 so that, when the detector 10 is mounted on the prover and when the shoulder 78 on the piston 71 engages the shoulder 42 of the bore 36 of the barrel 30, the nose portion 72 of the piston 71 will be disposed within the hole 14 through the prover wall. Similarly, the length of the cylindrically symmetric portion 84 of the piston 71 is selected such that abutment of the shoulders 42 and 48 will occur before the portion 84 of the piston 71 will enter the threaded portion of the barrel bore 36 in which the proximity switch 56 is disposed so that no damage can occur to the proximity switch 56 during use of the detector 10.

Following the selection of the dimensions of the piston 71, assembly begins with the insertion of the spring 86 and piston 71 into the bore 36 of the barrel 30 and the mounting of the barrel 30 on a jig that has a surface that will engage the lower end 34 of the barrel 30 and a hole to receive portions of the piston 71 that protrude from the bore 36. Such jig includes a micrometer head mounted to engage the nose portion 72 of the piston 71 and measure the distance between the end of the nose portion 72 and the lower end 34 of the barrel. Thus, the micrometer permits the piston 71 to be precisely placed, relative to the reference surface formed by the lower end 34 of the barrel 30, at a selected position in the bore 36 for which the piston 71 will extend a preselected distance into the prover 12 when the detector 10 is mounted on the prover 12 and, in addition, for which actuation of the proximity switch 56 can be selected to occur. Thereafter, the proximity switch 56 can be screwed into the bore 36 until the contacts therein are caused to engage by the selected positioning of the piston in the bore 36. Such positioning of the proximity switch 56 will thus cause the proximity switch 56 to be actuated for a preselected position of the piston 71 relative to the prover when the detector 10 is mounted on the prover.

As will become clear from the operation of the detector 10 to be described below, once the appropriate position of the proximity switch 56 has been so determined, no subsequent adjustment of the detector 10 need be made. Because of the elimination of any need to further adjust the detector 10, the detector 10 can be made tamper proof during the assembly thereof as will now be explained. For this purpose, the threaded portion of the casing 58 of the proximity switch 10 is coated with an epoxy resin prior to screwing the proximity switch 56 into the bore 36. When such resin subsequently sets, the proximity switch 56 becomes immobilized in the barrel 30 so that persons in the field will be unable to turn the proximity switch 56 and, by such tampering, disturb the factory setting of the detector 10.

The completion of the assembly of the detector 10 is carried out by mounting the cap 64 and O-ring 70 on the upper end 32 of the barrel 30 and, subsequently, by mounting the cover 88 over upper portions of the barrel 30 and the proximity switch 56. During such mounting, the tamper proof aspect of the invention is carried forward by coating the threads on the large diameter portion of the barrel 30, just above the flange 44, with epoxy resin so that the resin will be squeezed into the annular spacing between the bore 90 of the cover 88 and the casing 58 of the proximity switch 56 when the cover 88 is screwed onto the barrel 30. A small additional amount of resin introduced into the bore 90 of the cover 88 will then complete the potting of the proximity switch 56 so that no field adjustments of the detector 10, which might disturb the factory setting thereof, can be made. Thereafter, the detector 10 is mounted on the prover 12 via the plate 46 and screws 28 as described above.

Should it subsequently become necessary to replace the detector 10 on a prover, the construction and manner of assembly described above permit the replacement to be carried out without disturbing the calibration of the prover. That is, the calibration of the prover depends upon the position of the piston 71, relative to the prover, for which the contacts of the proximity switch 56 will close and such position has been functionally related to the relative positions of the piston and lower end 34 of the detector 10 in the initial adjustment of the detector 10. This relative position can be set into the replacement detector in the same manner that it was set into the detector being replaced so that the position of the piston of the replacement detector, relative to the prover, for which the proximity switch contacts close will be the same as such position for the detector being replaced.

OPERATION OF THE DETECTOR

Once mounted upon a prover, the piston 71 of the detector 10 will extend into the prover 12, through the hole 14, to be engaged by the travelling displacer in the prover during a proving run. As the displacer engages the nose portion 72 of the piston 71, the piston will be forced toward the proximity switch 56 until the cylindrically symmetric portion 84 reaches the position, set into the detector 10 at the factory, that will cause the contacts in the proximity switch 56 to close and thereby signal the passage of the displacer.

As will be clear from the above description of the detector 10, the position of the piston 71 for closure of the proximity switch contacts will be independent of effects which have been the source of problems with prior art detectors. In particular, since the detector 10 does not include dynamic seals, the only force exerted on the displacer by the piston 71 is the force exerted by the spring 86 and, since the piston need not be moved against a dynamic seal, such force can be made small. Thus, possible distortion of the travelling displacer as a source of inaccuracy or non-repeatability of meter proving data has been eliminated in the detector 10. Similarly, the position of the piston 71 for closure of the proximity switch contacts will be unaffected by any turning of the piston 71 in the barrel 30 that might be caused by the engagement of the piston 71 by the travelling displacer. The cylindrical symmetry of the portion 84 of the piston 71 about the approach axis of the proximity switch 56, coupled with the independence of the operation of the detector 10 upon a state of magnetization of such portion of the piston 71, will result in the piston 71 having the same effect upon the proximity switch 56 for all orientations of the piston 71 about the axis of the bore 36 of the detector 30.

It is clear that the present invention is well adapted to carry out the objects and attain the ends and advantages mentioned as well as those inherent therein. While a presently preferred embodiment of the invention has been described for purposes of this disclosure, numerous changes may be made which readily suggest themselves to those skilled in the art and which are encompassed within the spirit of the invention disclosed and as defined in the appended claims.

What is claimed is:

1. A detector for a prover, comprising:
    a barrel constructed of a non-ferromagnetic material and having a circular bore formed longitudinally therethrough;
    a magnet proximity switch mounted in portions of the barrel bore near one end of the barrel, the axis of said bore defining an approach axis for the proximity switch for actuating the proximity switch in response to movement of a nonmagnetized ferromagnetic body along the approach axis toward the proximity switch;
    a piston disposed partially in the barrel bore near the other end thereof for movement along the approach axis toward the proximity switch, the piston having a cylindrically symmetric portion, constructed of a ferromagnetic material and centered on the proximity switch approach axis, at the end thereof nearest the proximity switch; and
    means for urging the piston away from the proximity switch;
    wherein the piston is characterized as having an enlarged diameter portion adjacent said cylindrically symmetric portion to form a shoulder extending about the base of said cylindrically symmetric portion; and wherein the barrel bore is characterized as having a shoulder formed therein to engage said shoulder on the piston for limiting movement of the piston toward the proximity switch.

2. The detector of claim 1 further comprising:
    means for forming a static seal between the barrel and the proximity switch at said one end of the barrel; and
    means for forming a static seal between the barrel and the prover at said other end of the barrel.

3. The detector of claim 1 further comprising a cover closely fitting over portions of the barrel adjacent said one end thereof and the proximity switch, the cover having a longitudinal bore formed therethrough for engaging the outer periphery of the barrel and extending about portions of the barrel and the proximity switch.

4. The detector of claim 3 wherein portions of said cover about said one end of the barrel and the proximity switch are filled with epoxy resin.

5. The detector of claim 1 wherein portions of the magnetic proximity switch disposed within the barrel bore are coated with epoxy resin.

6. The detector of claim 1 for use with a prover loop having a bracket mounted thereon, said bracket having a plane surface formed thereon to abut said other end of the barrel; wherein said other end of the detector is characterized as having the form of a plane surface; and wherein the detector further comprises means for attaching the detector to the prover with said other end of the barrel engaging the plane surface of said bracket.

7. The detector of claim 6 wherein a flange is formed about the barrel adjacent said other end thereof and wherein the means for attaching the detector to the bracket comprises a mounting plate having bore therethrough to receive the barrel therethrough and having a counterbore formed in one side of said plate to mate with said flange.

8. A detector for a prover, comprising:
    a barrel constructed of a non-ferromagnetic material and having a circular bore formed longitudinally therethrough;
    a magnet proximity switch mounted in portions of the barrel bore near one end of the barrel, the axis of said bore defining an approach axis for the proximity switch for actuating the proximity switch in response to movement of a nonmagnetized ferromagnetic body along the approach axis toward the proximity switch;
    a piston disposed partially in the barrel bore near the other end thereof for movement along the approach axis toward the proximity switch, the piston having a cylindrically symmetric portion, constructed of a ferromagnetic material and centered on the proximity switch approach axis, at the end thereof nearest the proximity switch; and
    means for urging the piston away from the proximity switch;
    wherein a bracket having a plane surface formed thereon to abut said other end of the barrel is mounted on the prover; wherein said other end of the detector is characterized as having the form of a plane surface and a flange is formed about the barrel adjacent said other end thereof and wherein the detector further comprises means for attaching the detector to the prover with said other end of the barrel engaging the plane surface of said bracket, said means for attaching the detector to the prover comprising a mounting plate having a bore therethrough to receive the barrel therethrough and having a counterbore formed in one side of said plate to mate with said flange.

* * * * *